(12) United States Patent
Hong (10) Patent No.: US 12,309,629 B2
(45) Date of Patent: May 20, 2025

(54) INFORMATION PROCESSING METHODS, USER EQUIPMENT, AND BASE STATION (71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 404 days.

(21) Appl. No.: 17/906,012

(22) PCT Filed: Mar. 12, 2020

(86) PCT No.: PCT/CN2020/079040
§ 371 (c)(1),
(2) Date: Sep. 9, 2022

(87) PCT Pub. No.: WO2021/179262
PCT Pub. Date: Sep. 16, 2021

(65) Prior Publication Data
US 2023/0123352 A1    Apr. 20, 2023

(51) Int. Cl.
*H04W 24/10*    (2009.01)
*H04B 17/318*   (2015.01)
*H04W 36/00*    (2009.01)

(52) U.S. Cl.
CPC .......... *H04W 24/10* (2013.01); *H04B 17/318* (2015.01); *H04W 36/0058* (2018.08)

(58) Field of Classification Search
CPC . H04W 24/10; H04W 36/0058; H04W 48/16; H04W 48/18; H04W 8/205; H04B 17/318; H04B 17/253
See application file for complete search history.

(56) References Cited

U.S. PATENT DOCUMENTS 10,187,781 B2    1/2019  Kumar et al.
2016/0142960 A1  5/2016  Liu et al.
(Continued)

FOREIGN PATENT DOCUMENTS

CN    104902528 A    9/2015
CN    105873099 A    8/2016
(Continued)

OTHER PUBLICATIONS

International Search Report with English translation mailed on Dec. 21, 2020 in PCT/CN2020/079040 filed on Mar. 12, 2020 (4 pages).
(Continued)

*Primary Examiner* — Chuong A Ngo
(74) *Attorney, Agent, or Firm* — Oblon, McClelland, Maier & Neustadt, L.L.P.

(57) ABSTRACT

Provided in embodiments of the present disclosure are an information processing method, an information processing apparatus, a user equipment, a base station, and a storage medium. The method is applied to a user equipment, and the user equipment includes a first Subscriber Identity Module (SIM) in a connected state and one or more second SIMs in an idle state. The information processing method includes: receiving configuration information for performing a measurement on a second network with the second SIMs; and in response to that signal quality of a first network accessed by the first SIM satisfies a measurement condition, performing a measurement on a second network with one of the second SIMs based on the configuration information. The information processing method is beneficial to greatly reduce the time delay caused by the user equipment switching the network.

15 Claims, 5 Drawing Sheets

(56) References Cited

U.S. PATENT DOCUMENTS

2018/0255450 A1 9/2018 Kumar et al.
2022/0053607 A1* 2/2022 Rice .................... H04W 72/569

FOREIGN PATENT DOCUMENTS

| | | |
|---|---|---|
| CN | 110710262 A | 1/2017 |
| CN | 106604332 A | 4/2017 |
| CN | 106658629 A | 5/2017 |
| CN | 108495300 A | 9/2018 |
| CN | 108540975 A | 9/2018 |
| WO | WO 2015/169872 A1 | 11/2015 |
| WO | WO 2019/013446 A1 | 1/2019 |

OTHER PUBLICATIONS

Chinese Office Action with English translation dated Aug. 3, 2022 in Chinese Application 202080000500.9 (20 pages).

* cited by examiner

INFORMATION PROCESSING METHODS, USER EQUIPMENT, AND BASE STATION

CROSS-REFERENCE TO RELATED APPLICATIONS

This application is the national phase of International Application No. PCT/CN2020/079040 filed on Mar. 12, 2020, the disclosure of which is hereby incorporated by reference in its entirety for all purposes.

BACKGROUND OF THE INVENTION

Field of the Invention

The present disclosure relates to the field of communication technologies, in particular to information processing methods, information processing apparatuses, a user equipment, a base station, and a storage medium.

Description of the Related Art

With the development of wireless communication technologies, there are more and more terminals which are provided with multiple Subscriber Identity Modules (SIMs) on the market. These SIMs may be from a same operator or from different operators. Processes of terminals with multiple SIMs are mainly based on implementation of the terminals of manufacturers. Since there is no unified standard for the implementation, it leads to that terminal behaviors or processes have become so various, such as dual-SIM single-standby, dual-SIM dual-standby single communication, and dual-SIM dual-standby dual communication. Moreover, in the current network technology, the multiple SIMs of a terminal are often identified as belonging to different terminals, and each of the multiple SIMs communicates with the network independently without any cooperation with each other.

In the early stage of 5G network deployment, since the coverage of 5G network is not as good as that of 4G network, 5G terminals with multiple SIMs which preferentially reside or use 5G network for communication, will frequently switch to the 4G network, resulting in frequent interruption of services.

SUMMARY OF THE INVENTION

Embodiments of the present disclosure provide information processing methods, information processing apparatuses, a user equipment, a base station and a storage medium.

According to a first aspect of the embodiments of the present disclosure, there is provided an information processing method applied to a user equipment, the user equipment includes a first Subscriber Identity Module (SIM) in a connected state and one or more second SIMs in an idle state, the method includes receiving configuration information for performing a measurement on a second network with the second SIMs, and, in response to that signal quality of a first network accessed by the first SIM satisfies a measurement condition, performing a measurement on a second network with one of the second SIMs based on the configuration information.

According to a second aspect of the embodiments of the present disclosure, there is provided an information processing method applied to a base station, the method includes, in response to determining that a user equipment includes a first Subscriber Identity Module (SIM) in a connected state and one or more second SIMs in an idle state, configuring configuration information for performing a measurement on a second network with the second SIMs, and sending the configuration information to the user equipment; where the configuration information is used for the user equipment to perform a measurement on a second network with one of the second SIMs after signal quality of a first network accessed by the first SIM satisfies a measurement condition.

According to a third aspect of the embodiments of the present disclosure, there is provided a user equipment including a first processor and a first memory configured to store executable instructions executable by the first processor. The first processor is configured to execute the executable instructions to implement the information processing method applied to the user equipment according to any embodiment of the present disclosure.

According to a fourth aspect of the embodiments of the present disclosure, there is provided a base station including a second processor and a second memory configured to store executable instructions executable by the second processor. The second processor is configured to execute the executable instructions to implement the information processing method applied to the base station according to any embodiment of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION OF THE PREFERRED EMBODIMENTS

Exemplary embodiments will be described in detail herein, examples of which are illustrated in the accompanying drawings. When the following description refers to the drawings, unless otherwise indicated, the same numerals in different drawings indicate the same or similar elements. The embodiments described below do not represent all embodiments consistent with embodiments of the present disclosure. Rather, they are merely examples of apparatus and method consistent with some aspects of the embodiments of the present disclosure, as recited in the appended claims.

Terms used in the embodiments of the present disclosure are for the purpose of describing specific embodiments only, and are not intended to limit the embodiments of the present disclosure. The singular forms "a", "an" and "this" used in the embodiments of the present disclosure and the appended claims are also intended to include plural forms, unless the context clearly indicates other meanings. It should also be understood that the term "and/or" as used herein refers to and includes any and all possible combinations of one or more of the associated listed items.

It should be understood that although terms first, second, third, etc. may be used in the embodiments of the present disclosure to describe various information, such information should not be limited to these terms. These terms are only used to distinguish the same type of information from each other. For example, first information may also be referred to as second information, and similarly, the second information may also be referred to as the first information without departing from the scope of the embodiments of the present disclosure. Depending on the context, the word "if" as used herein can be interpreted as "at the time of", "when" or "in response to determining".

Figure 1:
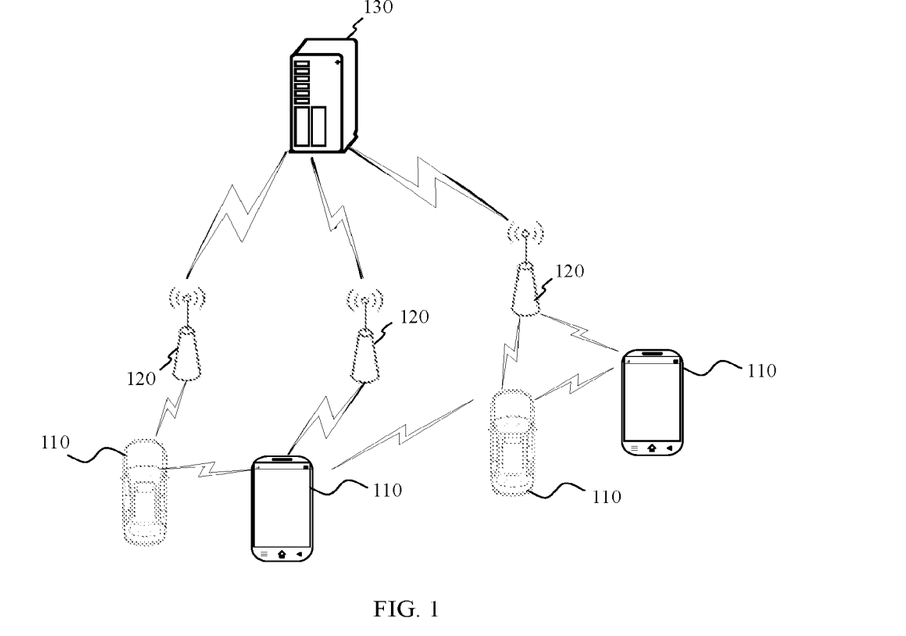
FIG. 1 is a schematic structural diagram of a wireless communication system.

Please refer to FIG. 1, which shows a schematic structural diagram of a wireless communication system according to an embodiment of the present disclosure. As shown in FIG. 1, the wireless communication system is a communication system based on the cellular mobile communication technology. The wireless communication system may include a plurality of user equipments 110 and a plurality of base stations 120.

The user equipment 110 may be a device that provides voice and/or data connectivity services to a user. The user equipment 110 may communicate with one or more core networks via a Radio Access Network (RAN). The user equipment 110 may be an Internet of Things user equipment, such as a sensor device, a mobile phone (or "cellular" phone) and a computer with an Internet of Things user equipment. For example, the user equipment 110 may be a fixed device, a portable device, a pocket-sized device, a handheld device, a device built in a computer or a vehicle-mounted device. For example, the user equipment 110 may be a station (STA), a subscriber unit, a subscriber station, a mobile station, a mobile, a remote station, an access point, a remote terminal, an access terminal, a user terminal, a user agent, a user device, or a user equipment. In an example, the user equipment 110 may also be a device of an unmanned aerial vehicle. In an example, the user equipment 110 may also be a vehicle-mounted device, for example, may be a trip computer having a wireless communication function, or a wireless user equipment connected to the trip computer. In an example, the user equipment 110 may also be a roadside device, for example, may be a street lamp, a signal lamp, or other roadside devices with a wireless communication function.

The base station 120 may be a network side device in a wireless communication system. The wireless communication system may be a 4th Generation mobile communication (4G) system, also known as a Long Term Evolution (LTE) system. In an example, the wireless communication system may also be a 5G system, also known as a New Radio (NR) system or a 5G NR system. In an example, the wireless communication system may also be a next generation of the 5G system. An access network in the 5G system may be called New Generation-Radio Access Network (NG-RAN).

The base station 120 may be an Evolved Node B (eNB) used in the 4G system. In an example, the base station 120 may also be a next Generation Node B (gNB) adopting a central distributed architecture in the 5G system. The base station 120, when adopting a central distributed architecture, usually includes a Central Unit (CU) and at least two Distributed Units (DUs). Protocol stacks of a Packet Data Convergence Protocol (PDCP) layer, a Radio Link Control (RLC) layer and a Media Access Control (MAC) layer may be arranged in the CU. A protocol stack of a Physical (PHY) layer may be arranged in the DU. A specific implementation manner of the base station 120 is not limited in the embodiment of the present disclosure.

A wireless connection may be established between the base station 120 and the user equipment 110 through a radio interface. In different implementations, the radio interface may be a radio interface based on the 4th Generation mobile communication network technology (4G) standard; or, the radio interface may be a radio interface based on the 5th Generation mobile communication network technology (5G) standard, for example, the radio interface may be a NR interface. In an example, the radio interface may also be a radio interface based on a next-generation mobile communication network technology standard of 5G.

In some embodiments, an End to End (E2E) connection may also be established between the user equipments 110, for example, in scenarios such as vehicle to vehicle (V2V) communication, vehicle to infrastructure (V2I) communication and vehicle to pedestrian (V2P) communication in vehicle to everything (V2X) communication.

Herein, the above mentioned user equipment can be considered as the terminal device in the following embodiments.

In some embodiments, the above wireless communication system may further include a network management device 130.

The plurality of base stations 120 may be connected with the network management device 130. The network management device 130 may be a core network device in the wireless communication system. For example, the network management device 130 may be a Mobility Management Entity (MME) in an Evolved Packet Core (EPC). Or, the network management device 130 may also be another core network device, for example, a Serving GateWay (SGW), a Public Data Network GateWay (PGW), a Policy and Charging Rules Function (PCRF) unit or a Home Subscriber Server (HSS). An implementation form of the network management device 130 is not limited in the embodiment of the present disclosure.

Figure 2:
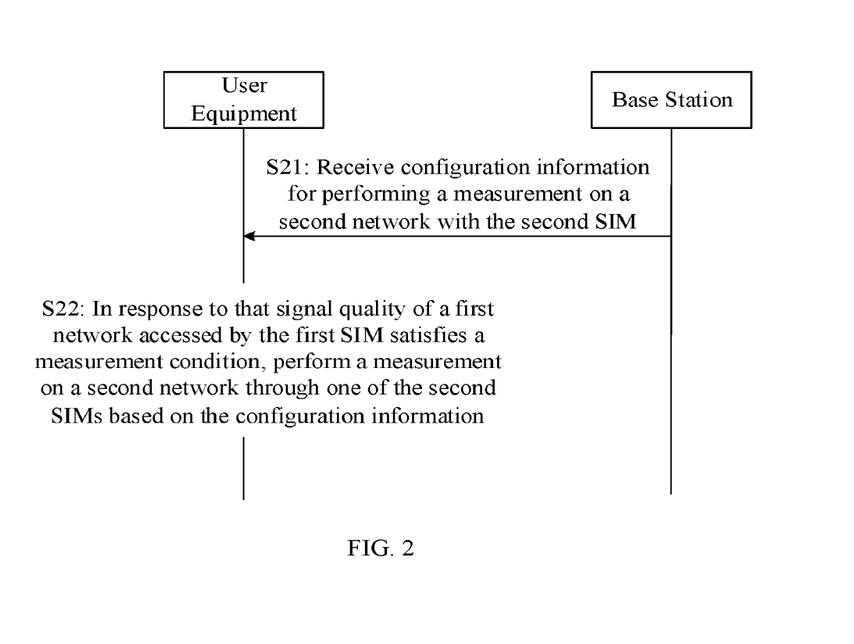
FIG. 2 is a flowchart of an information processing method according to an exemplary embodiment.

As shown in FIG. 2, there is provided an information processing method in an embodiment, the method is applied to a user equipment. The user equipment includes a first Subscriber Identity Module (SIM) in a connected state and one or more second SIMs in an idle state. The method includes the following steps:

step S21: configuration information for performing a measurement on a second network with the second SIMs is received; and step S22: in response to that signal quality of a first network accessed by the first SIM satisfies a measurement condition, a measurement on a second network is performed through one of the second SIMs based on the configuration information.

Herein, the user equipment may be a mobile phone, a computer, a server, a transceiver, a tablet device, a medical device, a wearable device, or the like.

Herein, either the first network or the second network may include, but is not limited to, one of the following: a 3rd Generation mobile communication technology (3G) network, a 4th Generation mobile communication technology (4G) network, a 5th Generation communication technology (5G) Non-Standalone (NSA) network, and a 5th Generation communication technology (5G) Standalone (SA) network. Herein, network types of the first network and the second network may be different.

In an embodiment, the 5G NSA network includes an EN-DC (E-UTRA-NR Dual Connectivity) network which is a dual access network of enhanced Long Term Evolution (LTE) and New Radio (NR) networks.

In an embodiment, the first network is a 5G network and the second network is a 4G network. In the embodiment, when the signal strength of the 5G network drops to a threshold satisfying the measurement condition, a measurement on the second network can be performed by using one of the second SIMs in advance. Thus, it is beneficial for the user equipment to switch to the second network in time, thereby reducing the time delay caused by the user equipment switching the network.

Herein, the configuration information includes but is not limited to at least one of the following: a to-be-measured reference signal, time domain and frequency domain resources occupied by the reference signal, a measurement period of the reference signal, a transmission period of the reference signal, and a transmit power of the reference signal.

In the embodiment, through the configuration information on the to-be-measured reference signal, a reference signal for performing a measurement on the second network with the second SIMs can be determined. In addition, in an embodiment of the present disclosure, the time domain and the frequency domain resources occupied by the reference signal may also be configured, and/or, methods of periodic measurement for the reference signal and/or the transmit power of the reference signal may be determined.

In some embodiments, the step S21 includes: receiving, through the first SIM, the configuration information for performing the measurement on the second network with the second SIMs. Thus, in the embodiment, the first SIM in the connected state can be used to receive the configuration information, and the probability of successfully receiving the configuration information can be improved.

In other embodiments, the step S21 includes: receiving, through the second SIMs, the configuration information for performing the measurement on the second network with the second SIMs.

Herein, an implementation method of receiving, through the second SIMs, the configuration information for performing the measurement on the second network with the second SIMs includes: receiving a paging message through the second SIMs, where the paging message carries the configuration information for performing the measurement on the second network with the second SIMs.

It can be understood that in the embodiment, the second SIMs are in an idle state and can receive paging messages. Moreover, the second SIM having received the paging message can remain in an idle state without random access. Thus, in the embodiment, the user equipment may also obtain the configuration information for performing the measurement on the second network with the second SIMs based on the paging message received by the second SIMs.

Another implementation method of receiving, through the second SIMs, the configuration information for performing the measurement on the second network with the second SIMs includes: before the second SIMs enter the idle state, receiving, through the second SIMs, the configuration information for performing the measurement on the second network with the second SIMs.

It can be understood that in the embodiment, before entering the idle state, the second SIMs can be connected to the first network, so that the configuration information can be received through the second SIMs from the first network. Thus, in the embodiment, the user equipment can obtain the configuration information for performing the measurement on the second network with the second SIMs in advance before the second SIMs enter the idle state.

In some embodiments, the step S21 includes: receiving Radio Resource Control (RRC) signaling sent by a base station in the first network, where an information unit of the radio resource control signaling carries the configuration information for performing the measurement on the second network with the second SIMs.

Herein, the base station may be an access device for a user equipment to access a mobile network. The base station may have various types, for example, the base station may be a 3G base station, a 4G base station, or a 5G base station.

Herein, for example, the base station is a base station in a 4G network or an EN-DC network, and the radio resource control signaling is RRC Connection Reconfiguration signaling. For example, the base station is a base station in a 5G network, and the radio resource control signaling is RRC Reconfiguration signaling.

Receiving the radio resource control signaling sent by the base station in the first network includes: receiving, through the first SIM, the radio resource control signaling sent by the base station in the first network.

In the embodiment, the configuration information may be received by receiving the radio control signaling sent by the base station. Moreover, the radio resource control signaling received by the user equipment from the base stations in different types of networks may be different. For example, from a base station in a 4G network, the user equipment receives radio resource control connection reconfiguration signaling; from a base station in a 5G network, the user equipment receives radio resource control reconfiguration signaling.

In the embodiment of the present disclosure, when the signal quality of the first network accessed by the first SIM in the connected state satisfies the measurement condition, a measurement on a second network can be performed by using the second SIMs in the idle state based on the received configuration information. In this way, a measurement on a second network un-accessed by the user equipment can be performed by using the second SIMs in the idle state in advance, so that it is beneficial to timely access the second network by using the second SIMs when the signal quality of the first network accessed by the first SIM is poor, thereby greatly reducing the time delay caused by the user equipment switching the network.

In the embodiment of the present disclosure, the number of the second SIMs in the idle state may be one, or two or more. In practical application, when there are two or more second SIMs in the idle state, a measurement on a second network can be performed by using any one of the two or more second SIMs.

For example, performing the measurement on the second network with the second SIMs based on the configuration information includes:

performing the measurement on the second network with any one of the second SIMs in the idle state based on the configuration information.

Thus, in the embodiment of the present disclosure, a measurement on a second network can be performed based on any second SIM in the idle state, so that the probability that the user equipment establishes a connection with the second network using the second SIMs can be improved.

In practical application, the base station provides configuration information for the first SIM in the connected state and the second SIMs in the idle state, respectively. The configuration information configured by the base station for the first SIM in the connected state is used to instruct the first SIM, when the signal quality of the first network accessed by the first SIM in the connected state satisfies the measurement condition, to notify the second SIMs to perform a measurement on a second network. The configuration information configured by the base station for the second SIMs in the idle state is used to instruct the second SIMs in the idle state to perform a measurement on the second network at a predetermined time interval. Thus, the user equipment can adopt at least two measurement methods for performing a measurement on the second network based on the configuration information.

Figure 3:
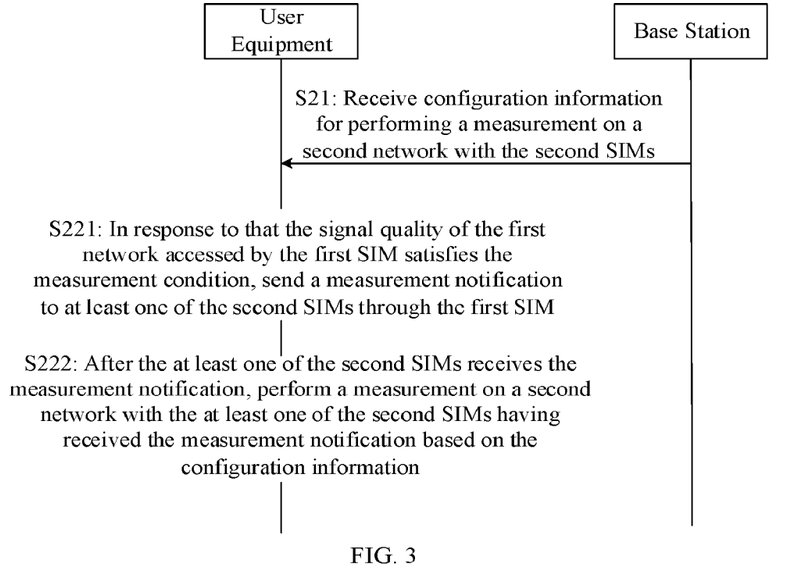
FIG. 3 is a flowchart of an information processing method according to an exemplary embodiment.

For example, as shown in FIG. 3, in some embodiments, the step S22 includes:

step S221: in response to that the signal quality of the first network accessed by the first SIM satisfies the measurement condition, a measurement notification is sent to at least one of the second SIMs through the first SIM; and step S222: after the at least one of the second SIMs receives the measurement notification, a measurement on a second network is performed with the at least one of the second SIMs having received the measurement notification based on the configuration information.

Herein, the measurement notification is used to notify the second SIMs to perform a measurement on a second network.

In some embodiments, the signal quality of the first network accessed by the first SIM satisfying the measurement condition includes a signal strength of a cell connected to the first SIM in the first network is less than a first threshold and/or a signal strength of a neighboring cell of a cell connected to the first SIM in the first network is less than a second threshold.

In an embodiment, the first threshold is the same as the second threshold. In another embodiment, the first threshold is different from the second threshold.

In an embodiment, the first threshold is greater than the second threshold. In another embodiment, the first threshold is less than the second threshold.

In other embodiments, the signal quality of the first network accessed by the first SIM satisfying the measurement condition includes:

a signal strength of a cell connected to the first SIM in the first network is less than a first threshold, and a duration in which the signal strength of the cell is less than the first threshold exceeds a first time threshold and/or a signal strength of a neighboring cell of a cell connected to the first SIM in the first network is less than a second threshold, and a duration in which the signal strength of the neighboring cell is less than the second threshold exceeds a second time threshold.

In an embodiment, the first time threshold is the same as the second time threshold. In another embodiment, the first time threshold is different from the second time threshold.

In an embodiment, the first time threshold is greater than the second time threshold. In another embodiment, the first time threshold is less than the second time threshold.

Herein, the threshold of the signal strength for determining whether the signal quality satisfies the measurement condition is greater than a threshold of the signal strength for determining whether the signal quality satisfies a network disconnection condition.

Thus, in the embodiment of the present disclosure, when the signal strength of the cell connected to the first SIM in the first network or the neighboring cell of the cell connected to the first SIM has not dropped to the threshold of the signal strength under the network disconnection condition, a measurement on a second network can be performed by using the second SIMs. Thus, the measurement on the second network can be performed in advance, which is beneficial to greatly reduce the time delay of the user equipment switching the network and improve the stable connection of data transmission.

In the embodiment of the present disclosure, when the signal quality of the first network accessed by the first SIM satisfies the measurement condition, the first SIM will actively notify the second SIMs so that a measurement on a second network can be performed by using the second SIMs. In this way, the second SIMs can be timely notified to perform a measurement on the second network, so as to ensure that a measurement on the second network can be performed by using the second SIMs in advance before the first SIM is disconnected from the first network, which is beneficial to establish a connection with the second network in time.

Furthermore, in the embodiment of the present disclosure, unless it is determined that the signal quality of the connected first network satisfies the measurement condition, it is determined that a measurement on a second network can be performed with the second SIMs, which can save the resource consumption of network measurement to a certain extent.

In addition, in the embodiment of the present disclosure, it is further determined that when a signal strength of a cell connected to the first SIM in the connected state in the first network is less than a first threshold and/or a neighboring cell of the cell connected to the first SIM is less than a second threshold, or when a signal strength of a cell connected to the first SIM in the first network is less than a first threshold and a duration in which the signal strength of the cell is less than the first threshold exceeds a first time threshold, and/or a signal strength of a neighboring cell of a cell connected to the first SIM card in the first network is less than a second threshold and a duration in which the signal strength of the neighboring cell is less than the second threshold exceeds a second time threshold, and/or in other situations, the signal quality of the first network connected to the first SIM of the user equipment satisfies the measurement condition.

In other embodiments, it is not necessary for the first SIM to send a notification message to the second SIMs, and the second SIMs may actively perform a measurement on a second network. For example, in an embodiment, the step S22 includes: a measurement on a second network is performed at a preset time interval with the second SIMs based on the configuration information. Herein, the preset time interval is the same as the measurement period in the above embodiment. Thus, in the embodiment of the present disclosure, a measurement on a second network can also be performed by using the second SIMs based on the preset time interval, thereby facilitating the user equipment to access the second network with the second SIMs in time when the first SIM is disconnected from the first network.

Figure 4:
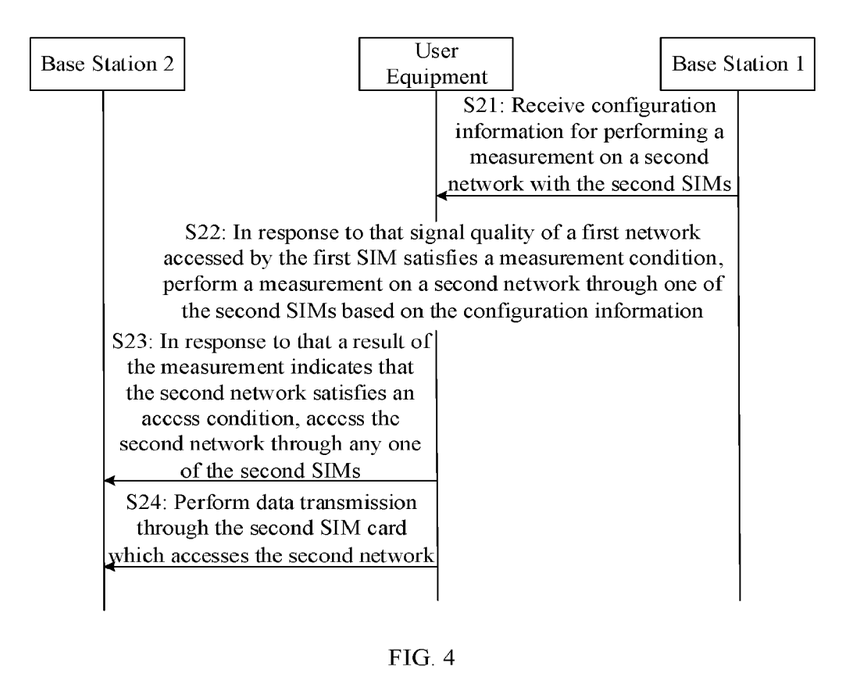
FIG. 4 is a flowchart of an information processing method according to an exemplary embodiment.

As shown in FIG. 4, in some embodiments, the method further includes:

step S23: in response to that a result of the measurement indicates that the second network satisfies an access condition, the second network is accessed through any one of the second SIMs; and step S24: data transmission is performed through the second SIM which accesses the second network.

The second network satisfies the access condition includes:

a signal strength of the second network is greater than a third threshold, and a duration in which the signal strength of the second network is greater than the third threshold exceeds a third time threshold;

where the third threshold is greater than or equal to the first threshold and greater than or equal to the second threshold; the third time threshold is greater than or equal to the first time threshold and greater than or equal to the second time threshold.

Herein, as shown in FIG. 4, the base station in the first network is a base station 1, and the base station in the second network is a base station 2.

In the embodiment of the present disclosure, since the third threshold is greater than or equal to the first threshold and greater than or equal to the second threshold, and/or the third time threshold is greater than or equal to the first time threshold and greater than or equal to the second time threshold, the signal strength of the second network is greater than the signal strength of the first network, and/or the duration of stable signal transmission through the second network is also greater than the duration of stable signal transmission through the first network. Thus, when the user equipment accesses the second network for data transmission through the second SIMs, the quality of data transmission can be greatly improved.

In other embodiments, before the step S24, the method further includes: a notification that the second SIM accesses the second network is sent to the first SIM through any one of the second SIMs, after receiving the notification that the second SIM accesses the second network, the first SIM sends service data of the first SIM to the second SIM which accesses the second network before the first SIM is disconnected from the first network. Thus, in the embodiment, after the first SIM is disconnected from the first network, the second SIM and the second network can be used for data transmission of unfinished service of the first SIM, thus improving the stable connection of data transmission.

It should be noted here that the description of the following information processing methods are applied to a base station and are similar to the description of the information processing methods applied to the user equipment. For the technical details not disclosed in the embodiments of the information processing methods applied to the base station in the present disclosure, please refer to the description of the embodiments of the information processing methods applied to the user equipment in the present disclosure, and will not be described in detail herein.

Figure 5:
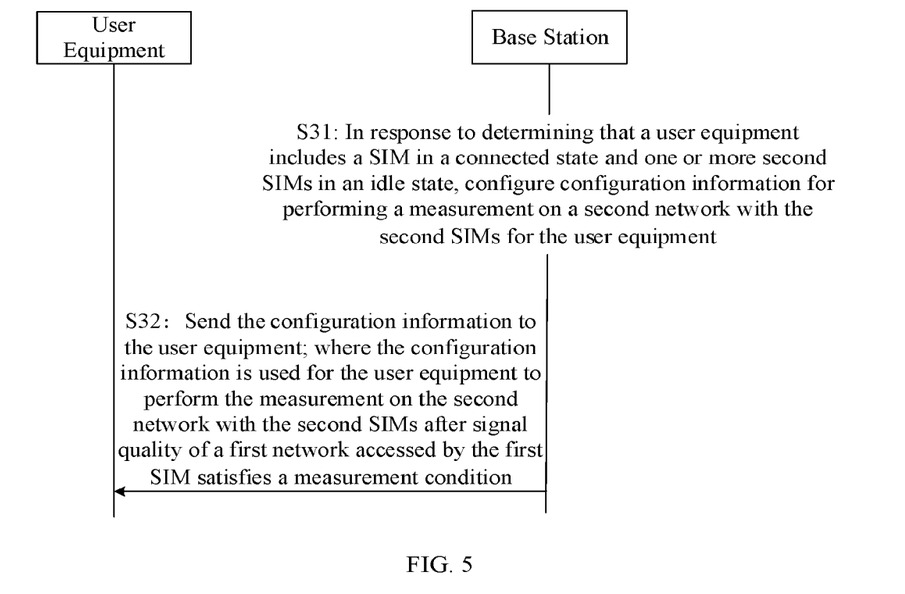
FIG. 5 is a flowchart of an information processing method according to an exemplary embodiment.

As shown in FIG. 5, an embodiment of the present disclosure provides an information processing method applied to a base station, the method includes:

step S31: in response to determining that a user equipment includes a first Subscriber Identity Module (SIM) in a connected state and one or more second SIMs in an idle state, configuration information for performing a measurement on a second network with the second SIMs is configured for the user equipment; and step S32: the configuration information is sent to the user equipment; where the configuration information is used for the user equipment to perform the measurement on the second network with the second SIMs after signal quality of a first network accessed by the first SIM satisfies a measurement condition.

In some embodiments, sending the configuration information to the user equipment includes sending the configuration information to the first SIM of the user equipment.

In some embodiments, the configuration information is used for the user equipment to perform a measurement on the second network with the second SIMs after the signal quality of the first network accessed by the first SIM satisfies the measurement condition and the user equipment sends a notification message for performing a measurement on the second network to the second SIMs.

In some embodiments, the signal quality of the first network accessed by the first SIM satisfies the measurement condition includes a signal strength of a cell connected to the first SIM in the first network is less than a first threshold and/or a signal strength of a neighboring cell of a cell connected to the first SIM in the first network is less than a second threshold.

In other embodiments, the signal quality of the first network accessed by the first SIM satisfies the measurement condition includes a signal strength of a cell connected to the first SIM in the first network is less than a first threshold, and a duration in which the signal strength of the cell is less than the first threshold exceeds a first time threshold and/or a signal strength of a neighboring cell of a cell connected to the first SIM in the first network is less than a second threshold, and a duration in which the signal strength of the neighboring cell is less than the second threshold exceeds a second time threshold.

In some embodiments, sending the configuration information to the user equipment includes sending radio resource control signaling to the user equipment, where an information unit of the radio resource control signaling carries the configuration information.

Figure 6:
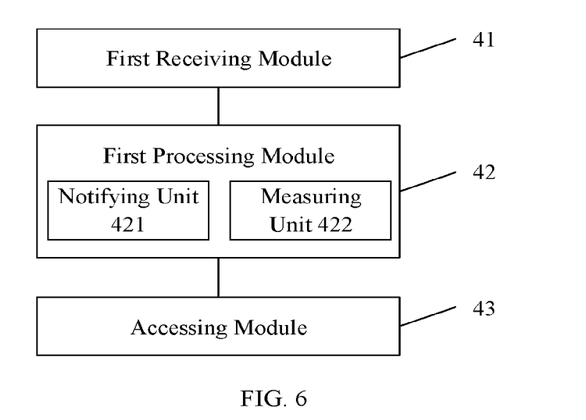
FIG. 6 is a block diagram of an information processing apparatus according to an exemplary embodiment.

As shown in FIG. 6, an embodiment of the present disclosure provides an information processing apparatus applied to a user equipment, the user equipment includes a first Subscriber Identity Module (SIM) in a connected state and one or more second SIMs in an idle state, the apparatus includes a first receiving module 41, configured to receive configuration information for performing a measurement on a second network with the second SIMs, and a first processing module 42, configured to, in response to that signal quality of a first network accessed by the first SIM satisfies a measurement condition, perform a measurement on a second network with one of the second SIMs based on the configuration information.

In some embodiments, the first receiving module 41 is configured to receive the configuration information for performing the measurement on the second network with the second SIMs through the first SIM.

In some embodiments, the first processing module 42 includes a notifying unit 421, configured to, in response to that the signal quality of the first network accessed by the first SIM satisfies the measurement condition, send a measurement notification to at least one of the second SIMs through the first SIM, and a measuring unit 422, configured to, after the at least one of the second SIMs receives the measurement notification, perform the measurement on the second network with the at least one of the second SIMs having received the measurement notification based on the configuration information.

In some embodiments, the signal quality of the first network accessed by the first SIM satisfying the measurement condition includes a signal strength of a cell connected to the first SIM in the first network is less than a first threshold and/or a signal strength of a neighboring cell of a cell connected to the first SIM in the first network is less than a second threshold.

In some embodiments, the signal quality of the first network accessed by the first SIM satisfying the measurement condition includes a signal strength of a cell connected to the first SIM in the first network is less than a first threshold, and a duration in which the signal strength of the cell is less than the first threshold exceeds a first time threshold and/or a signal strength of a neighboring cell of a cell connected to the first SIM in the first network is less than a second threshold, and a duration in which the signal strength of the neighboring cell is less than the second threshold exceeds a second time threshold.

In some embodiments, the apparatus further includes an accessing module 43, configured to, in response to that a result of the measurement indicates that the second network satisfies an access condition, access the second network through any one of the second SIMs.

The first processing module 42 is configured to perform data transmission through the second SIM which accesses the second network.

In some embodiments, the second network satisfies the access conditions includes a signal strength of the second network is greater than a third threshold, and a duration in which the signal strength of the second network is greater than the third threshold exceeds a third time threshold, where the third threshold is greater than or equal to the first threshold and greater than or equal to the second threshold, the third time threshold is greater than or equal to the first time threshold and greater than or equal to the second time threshold.

In some embodiments, the first receiving module 41 is configured to receive radio resource control signaling sent by a base station in the first network, where an information unit of the radio resource control signaling carries the configuration information for performing the measurement on the second network with the second SIMs.

In some embodiments, the first processing module 42 is configured to perform the measurement on the second network with any one of the second SIMs in the idle state based on the configuration information.

Figure 7:
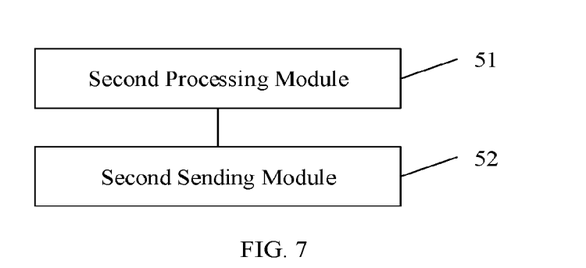
FIG. 7 is a block diagram of an information processing apparatus according to an exemplary embodiment.

As shown in FIG. 7, an embodiment of the present disclosure provides an information processing apparatus applied to a base station, the apparatus includes a second processing module 51, configured to, in response to determining that a user equipment comprises a first Subscriber Identity Module (SIM) in a connected state and one or more second SIMs in an idle state, configure configuration information for performing a measurement on a second network with the second SIMs, and a second sending module 52, configured to send the configuration information to the user equipment; where the configuration information is used for the user equipment to perform a measurement on a second network with one of the second SIMs after signal quality of a first network accessed by the first SIM satisfies a measurement condition.

In some embodiments, the second sending module 52 is configured to send the configuration information to the first SIM of the user equipment.

In some embodiments, the configuration information is used for the user equipment to perform a measurement on the second network with one of the second SIMs after the signal quality of the first network accessed by the first SIM satisfies the measurement condition and the user equipment sends a notification message for performing the measurement on the second network to the second SIMs.

In some embodiments, the signal quality of the first network accessed by the first SIM satisfying the measurement condition includes a signal strength of a cell connected to the first SIM in the first network is less than a first threshold and/or a signal strength of a neighboring cell of a cell connected to the first SIM in the first network is less than a second threshold.

In some embodiments, the signal quality of the first network accessed by the first SIM satisfying the measurement condition includes a signal strength of a cell connected to the first SIM in the first network is less than a first threshold, and a duration in which the signal strength of the cell is less than the first threshold exceeds a first time threshold and/or a signal strength of a neighboring cell of a cell connected to the first SIM in the first network is less than a second threshold, and a duration in which the signal strength of the neighboring cell is less than the second threshold exceeds a second time threshold.

In some embodiments, the second sending module 52 is configured to send radio resource control signaling to the user equipment, where an information unit of the radio resource control signaling carries the configuration information.

With regard to the apparatuses in the above embodiments, the specific manner in which each module performs operations has been described in detail in the embodiments of the methods, and will not be described in detail herein.

An embodiment of the present disclosure provides a user equipment, the user equipment includes a first processor, and a first memory configured to store executable instructions executable by the first processor. The first processor is configured to execute the executable instructions to implement the information processing method applied to the user equipment according to any embodiment of the present disclosure.

The present disclosure provides a base station, the base station includes a second processor, and a second memory configured to store executable instructions executable by the second processor. The second processor is configured to execute the executable instructions to implement the information processing method applied to the base station according to any embodiment of the present disclosure.

The processor (the first processor or the second processor) may include various types of storage media, which are non-transitory computer storage media, and can continue to memorize information stored thereon after the communication device is powered off. Herein, the communication device includes a base station or a user equipment.

The processor may be connected to the memory (the first memory or the second processor) through a bus or the like for reading an executable program stored on the memory to perform, for example, at least one of the methods shown in FIGS. 2 to 5.

An embodiment of the present disclosure also provides a non-transitory computer storage medium, where the computer storage medium stores a computer executable program that, when executed by a processor, implements the information processing method according to any embodiment of the present disclosure, for example, at least one of the methods shown in FIGS. 2 to 5.

With regard to the apparatuses in the above embodiments, the specific manner in which each module performs operations has been described in detail in the embodiments of the methods, and will not be described in detail herein.

Figure 8:
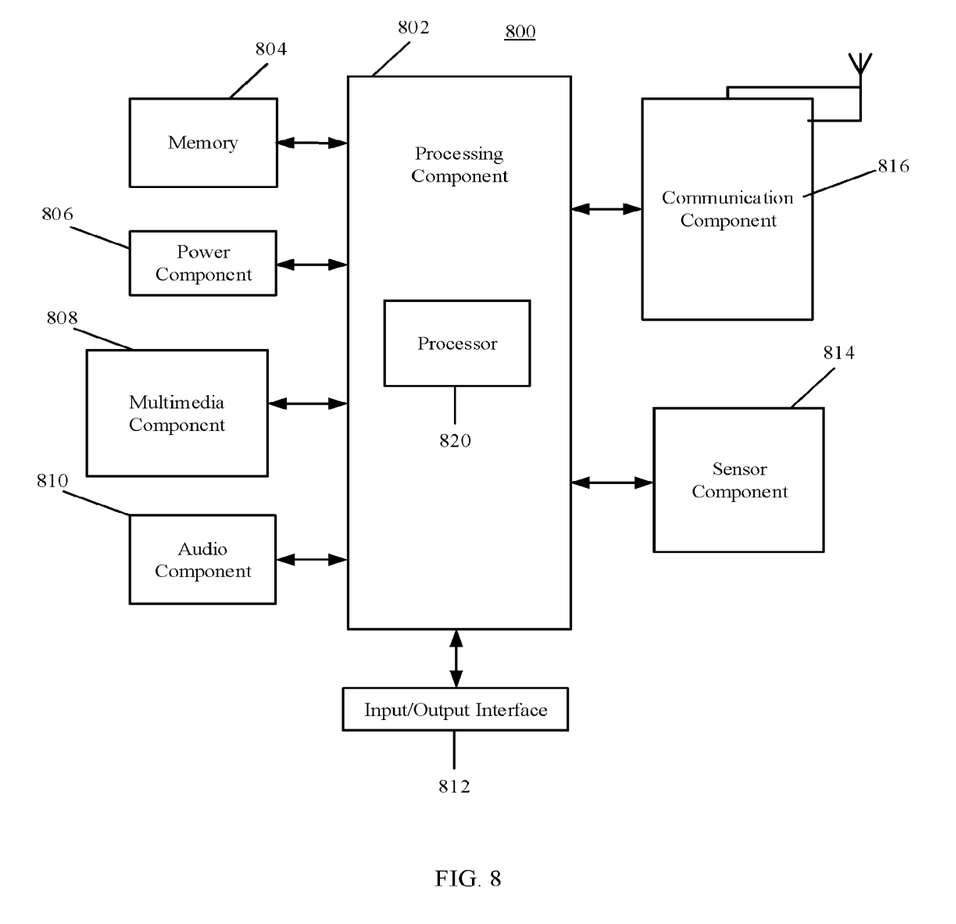
FIG. 8 is a block diagram of a user equipment according to an exemplary embodiment.

FIG. 8 is a block diagram of a user equipment (UE) 800 according to an exemplary embodiment. For example, the user equipment 800 may be a mobile phone, a computer, a digital broadcasting device, a messaging device, a game console, a tablet device, a medical device, a fitness device, a personal digital assistant, or the like.

Referring to FIG. 8, the user equipment 800 can include one or more of the following components: a processing component 802, a memory 804, a power component 806, a multimedia component 808, an audio component 810, an input/output (I/O) interface 812, a sensor component 814, and a communication component 816.

The processing component 802 generally controls the overall operations of the user equipment 800, such as operations associated with display, telephone calls, data communications, camera operations, and recording operations. The processing component 802 can include one or more processors 820 to execute instructions to complete all or part of the steps of the above methods. In addition, the processing component 802 can include one or more modules to facilitate interaction between the processing component 802 and other components. For example, the processing component 802 can include a multimedia module to facilitate interaction between the multimedia component 808 and the processing component 802.

The memory 804 is configured to store various types of data to support operations at the user equipment 800. Examples of such data include instructions for any application or method operating on the user equipment 800, contact data, phone book data, messages, pictures, videos, and so on. The memory 804 can be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power component 806 provides power to various components of the user equipment 800. The power component 806 can include a power management system, one or more power sources, and other components associated with generating, managing, and distributing power for the user equipment 800.

The multimedia component 808 includes a screen that provides an output interface between the user equipment 800 and a user. In some embodiments, the screen can include a liquid crystal display (LCD) and a touch panel (TP). If the screen includes a touch panel, the screen can be implemented as a touch screen to receive input signals from the user. The touch panel includes one or more touch sensors to sense touches, swipes, and gestures on the touch panel. The touch sensor can not only sense boundaries of a touch or swipe action, but also detect the duration and pressure related to the touch or swipe action. In some embodiments, the multimedia component 808 includes a front camera and/or a rear camera. When the user equipment 800 is in an operation mode, such as a shooting mode or a video mode, the front camera and/or the rear camera can receive external multimedia data. Each of the front and rear cameras can be a fixed optical lens system or have focal length and optical zooming capabilities.

The audio component 810 is configured to output and/or input audio signals. For example, the audio component 810 includes a microphone (MIC) that is configured to receive external audio signals when the user equipment 800 is in an operation mode, such as a call mode, a recording mode, and a voice recognition mode. The received audio signals can be further stored in the memory 804 or transmitted via the communication component 816. In some embodiments, the audio component 810 further includes a speaker for outputting audio signals.

The I/O interface 812 provides an interface between the processing component 802 and peripheral interface modules. The peripheral interface modules can be keyboards, a click wheels, a buttons, or the like. These buttons can include, but are not limited to, home button, volume button, start button, and lock button.

The sensor component 814 includes one or more sensors for providing the user equipment 800 with status assessment in various aspects. For example, the sensor component 814 can detect an open/closed state of the user equipment 800, relative positioning of components, such as the display and keypad of the user equipment 800. The sensor component 814 can also detect a change in position of the user equipment 800 or a component of the user equipment 800, the presence or absence of user contact with the user equipment 800, orientation or acceleration/deceleration of the user equipment 800, and temperature change of the user equipment 800. The sensor component 814 can include a proximity sensor configured to detect the presence of nearby objects without any physical contact. The sensor assembly 814 can also include a light sensor, such as a Complementary Metal-Oxide-Semiconductor (CMOS) or Charged Coupled Device (CCD) image sensor, for use in imaging applications. In some embodiments, the sensor component 814 can further include an acceleration sensor, a gyro sensor, a magnetic sensor, a pressure sensor, or a temperature sensor.

The communication component 816 is configured to facilitate wired or wireless communication between the user equipment 800 and other devices. The user equipment 800 can access a wireless network based on a communication standard, such as Wi-Fi, 2G or 3G, or a combination thereof. In an exemplary embodiment, the communication component 816 receives broadcast signals or broadcast-related information from an external broadcast management system via a broadcast channel. In one exemplary embodiment, the communication component 816 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the user equipment 800 can be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components for performing the above methods.

In an exemplary embodiment, there is also provided a non-transitory computer-readable storage medium including executable instructions, such as the memory 804 including executable instructions executable by the processor 820 of the user equipment 800 to implement the above methods. For example, the non-transitory computer-readable storage medium can be a ROM, a random access memory (RAM), a CD-ROM, a magnetic tape, a floppy disk, and an optical data storage device, etc.

Figure 9:
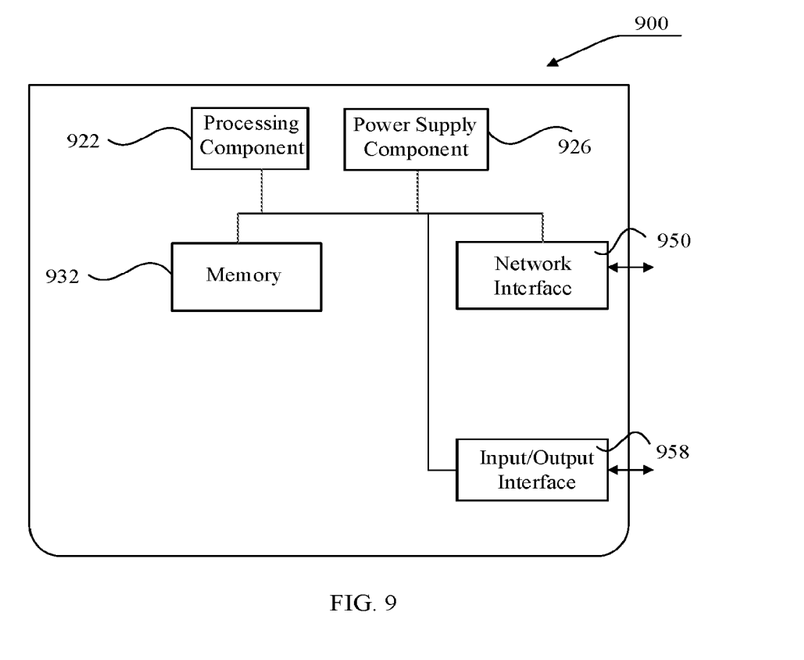
FIG. 9 is a block diagram of a base station according to an exemplary embodiment.

FIG. 9 is a structure of a base station according to an embodiment of the present disclosure. For example, the base station 900 may be provided as a network side device. Referring to FIG. 9, the base station 900 includes a processing component 922, which further includes one or more processors, and a memory resource represented by a memory 932 for storing instructions executable by the processing component 922, such as an application program. The application program stored in memory 932 may include one or more modules, each corresponding to a set of instructions. In addition, the processing component 922 is configured to execute the instructions to perform any one of the above described methods applied to the base station, for example, the methods shown in FIGS. 2-3.

The base station 900 may also include a power supply component 926 configured to perform power management of the base station 900, a wired or wireless network interface 950 configured to connect the base station 900 to a network, and an input/output (I/O) interface 958. The base station 900 may operate based on an operating system stored in the memory 932, such as Windows Server™, Mac OS X™, Unix™, Linux™, FreeBSD™ or the like.

Those skilled in the art will readily recognize other embodiments of the present disclosure upon consideration of the specification and practice of the present disclosure disclosed herein. The present disclosure is intended to cover any variations, uses, or adaptations of the present disclosure, which follow general principles of the present disclosure and include common knowledge or customary means in the art that are not disclosed in the present disclosure. The specification and embodiments are exemplary only, with the true scope and spirit of the present disclosure being indicated by the following claims.

It should be understood that the present disclosure is not limited to the precise structure that has been described above and shown in the drawings, and various modifications and changes may be made without departing from the scope thereof. The scope of the present disclosure is limited only by the appended claims.

The invention claimed is:

1. An information processing method, performed by a user equipment which comprises a first Subscriber Identity Module (SIM) in a connected state and one or more second SIMs in an idle state, the information processing method comprising:
receiving configuration information for performing a measurement on a second network with the second SIMs; and
in response to that signal quality of a first network accessed by the first SIM satisfies a measurement condition, performing a measurement on a second network with one of the second SIMs based on the configuration information;
wherein the signal quality of the first network accessed by the first SIM satisfies the measurement condition, comprises at least one of:
a signal strength of a cell connected to the first SIM in the first network is less than a first threshold, and a duration in which the signal strength of the cell is less than the first threshold exceeds a first time threshold; or
a signal strength of a neighboring cell of the cell connected to the first SIM in the first network is less than a second threshold, and a duration in which the signal strength of the neighboring cell is less than the second threshold exceeds a second time threshold;
wherein the method further comprises:
in response to that a result of the measurement indicates that the second network satisfies an access condition, accessing the second network through any one of the second SIMs; and
performing data transmission through the second SIM which accesses the second network;
wherein the second network satisfies the access condition comprises:
a signal strength of the second network is greater than a third threshold, and a duration in which the signal strength of the second network is greater than the third threshold exceeds a third time threshold,
wherein the third threshold is greater than or equal to the first threshold and greater than or equal to the second threshold; the third time threshold is greater than or equal to the first time threshold and greater than or equal to the second time threshold.

2. The information processing method according to claim 1, wherein receiving the configuration information for performing the measurement on the second network with the second SIMs, comprises:
receiving, through the first SIM, the configuration information for performing the measurement on the second network with the second SIMs.

3. The information processing method according to claim 1, wherein, in response to that the signal quality of the first network accessed by the first SIM satisfies the measurement condition, performing the measurement on the second network with one of the second SIMs based on the configuration information, comprises:
in response to that the signal quality of the first network accessed by the first SIM satisfies the measurement condition, sending a measurement notification to at least one of the second SIMs through the first SIM; and
after the at least one of the second SIMs receives the measurement notification,
performing the measurement on the second network with the at least one of the second SIMs having received the measurement notification based on the configuration information.

4. The information processing method according to claim 1, wherein the signal quality of the first network accessed by the first SIM satisfies the measurement condition, comprises at least one of:
the signal strength of the cell connected to the first SIM in the first network is less than the first threshold; or,
the signal strength of the neighboring cell of the cell connected to the first SIM in the first network is less than the second threshold.

5. The information processing method according to claim 1, wherein receiving the configuration information for performing the measurement on the second network with the second SIMs comprises:
receiving radio resource control signaling sent by a base station in the first network, wherein an information unit of the radio resource control signaling carries the configuration information for performing the measurement on the second network with the second SIMs.

6. An information processing method, performed by a base station, the information processing method comprising:
in response to determining that a user equipment comprises a first Subscriber Identity Module (SIM) in a connected state and one or more second SIMs in an idle state, configuring configuration information for performing a measurement on a second network with the second SIMs; and sending the configuration information to the user equipment; wherein the configuration information is used for the user equipment to perform a measurement on a second network with one of the second SIMs after signal quality of a first network accessed by the first SIM satisfies a measurement condition;

wherein the signal quality of the first network accessed by the first SIM satisfies the measurement condition, comprises at least one of:

a signal strength of a cell connected to the first SIM in the first network is less than a first threshold, and a duration in which the signal strength of the cell is less than the first threshold exceeds a first time threshold; or a signal strength of a neighboring cell of the cell connected to the first SIM in the first network is less than a second threshold, and a duration in which the signal strength of the neighboring cell is less than the second threshold exceeds a second time threshold;

wherein the user equipment is further configured to: in response to that a result of the measurement indicates that the second network satisfies an access condition, access the second network through any one of the second SIMs; and perform data transmission through the second SIM which accesses the second network;

wherein the second network satisfies the access condition comprises:

a signal strength of the second network is greater than a third threshold, and a duration in which the signal strength of the second network is greater than the third threshold exceeds a third time threshold, wherein the third threshold is greater than or equal to the first threshold and greater than or equal to the second threshold; the third time threshold is greater than or equal to the first time threshold and greater than or equal to the second time threshold.

7. The information processing method according to claim 6, wherein sending the configuration information to the user equipment comprises:

sending the configuration information to the first SIM of the user equipment.

8. The information processing method according to claim 6, wherein the configuration information is used for the user equipment to perform a measurement on the second network with one of the second SIMs after the signal quality of the first network accessed by the first SIM satisfies the measurement condition and the user equipment sends a notification message for performing the measurement on the second network to the second SIMs.

9. The information processing method according to claim 6, wherein the signal quality of the first network accessed by the first SIM satisfies the measurement condition, comprises at least one of:

the signal strength of the cell connected to the first SIM in the first network is less than the first threshold; or, the signal strength of the neighboring cell of the cell connected to the first SIM in the first network is less than the second threshold.

10. The information processing method according to claim 6, wherein sending the configuration information to the user equipment comprises:

sending radio resource control signaling to the user equipment, wherein an information unit of the radio resource control signaling carries the configuration information.

11. A base station, wherein the base station comprises:
a second processor;
a second memory configured to store executable instructions executable by the second processor,
wherein the second processor is configured to execute the executable instructions to implement the information processing method according to claim 6.

12. A user equipment, comprising a first Subscriber Identity Module (SIM) in a connected state and one or more second SIMs in an idle state, the user equipment further comprising:

a first processor; and
a first memory configured to store executable instructions executable by the first processor,
wherein the first processor is configured to execute the executable instructions to perform:

receiving configuration information for performing a measurement on a second network with the second SIMs; and in response to that signal quality of a first network accessed by the first SIM satisfies a measurement condition, performing a measurement on a second network with one of the second SIMs based on the configuration information;

wherein the signal quality of the first network accessed by the first SIM satisfies the measurement condition, comprises at least one of:

a signal strength of a cell connected to the first SIM in the first network is less than a first threshold, and a duration in which the signal strength of the cell is less than the first threshold exceeds a first time threshold; or a signal strength of a neighboring cell of the cell connected to the first SIM in the first network is less than a second threshold, and a duration in which the signal strength of the neighboring cell is less than the second threshold exceeds a second time threshold;

wherein the first processor is further configured to execute the executable instructions to perform:

in response to that a result of the measurement indicates that the second network satisfies an access condition, accessing the second network through any one of the second SIMs; and performing data transmission through the second SIM which accesses the second network;

wherein the second network satisfies the access condition comprises:

a signal strength of the second network is greater than a third threshold, and a duration in which the signal strength of the second network is greater than the third threshold exceeds a third time threshold, wherein the third threshold is greater than or equal to the first threshold and greater than or equal to the second threshold; the third time threshold is greater than or equal to the first time threshold and greater than or equal to the second time threshold.

13. The user equipment according to claim 12, wherein when receiving the configuration information for performing the measurement on the second network with the second SIMs, the first processor is further configured to execute the executable instructions to perform:

receiving, through the first SIM, the configuration information for performing the measurement on the second network with the second SIMs.

14. The user equipment according to claim 12, wherein when in response to that the signal quality of the first network accessed by the first SIM satisfies the measurement condition, performing the measurement on the second network with one of the second SIMs based on the configuration information, the first processor is further configured to execute the executable instructions to perform:
- in response to that the signal quality of the first network accessed by the first SIM satisfies the measurement condition, sending a measurement notification to at least one of the second SIMs through the first SIM; and
- after the at least one of the second SIMs receives the measurement notification,
- performing the measurement on the second network with the at least one of the second SIMs having received the measurement notification based on the configuration information.

15. The user equipment according to claim 12, wherein the signal quality of the first network accessed by the first SIM satisfies the measurement condition, comprises at least one of:
- the signal strength of the cell connected to the first SIM in the first network is less than the first threshold; or,
- the signal strength of the neighboring cell of the cell connected to the first SIM in the first network is less than the second threshold.

\* \* \* \* \*